(12) United States Patent
Rubin

(10) Patent No.: US 6,275,189 B1
(45) Date of Patent: Aug. 14, 2001

(54) PASSIVE TARGET DETECTION AND IDENTIFICATION SYSTEM

(75) Inventor: William L. Rubin, Whitestone, NY (US)

(73) Assignee: Lockheed Martin Corporation, Bethesda, MD (US)

(*) Notice: Subject to any disclaimer, the term of this patent is extended or adjusted under 35 U.S.C. 154(b) by 0 days.

(21) Appl. No.: 06/596,344

(22) Filed: Apr. 3, 1984

(51) Int. Cl.[7] ................ G01S 5/04; G01S 3/02
(52) U.S. Cl. ..................... 342/458; 342/446
(58) Field of Search ............... 343/458, 424, 343/423, 346, 445, 465, 446, 387

(56) References Cited

U.S. PATENT DOCUMENTS 4,393,382 * 7/1983 Jones ........................ 342/458
4,422,076 * 12/1983 Tricoles et al. ............... 342/458

* cited by examiner

Primary Examiner—Gregory C. Issing
(74) Attorney, Agent, or Firm—Seymour Levine (57) ABSTRACT

A passive target positioning system utilizes three stations positioned on a linear baseline with a central master station positioned predetermined distances from two slave stations. Angle to the target is determined from the time differences of arrival at the master station and each of the slave stations. Range to the target, in one embodiment, is determined from the difference of the two time difference of arrival measurements and the angle-to-target, while in a second embodiment from the time differences of arrival. A scannable antenna with frequency selection capability provides a spatial sector and frequency band selectivity.

11 Claims, 7 Drawing Sheets

FIG.1A.

(1a) $$\cos \phi_1 = \frac{CT_1}{L}$$

(1b) $$\cos \phi_2 = \frac{CT_2}{L}$$

(3) $$\phi_1 - \phi_2 = \frac{C}{L \sin \phi}(T_2 - T_1)$$

(2a) $$R = L \frac{\sqrt{\sin^2 \phi_1 + \sin^2 \phi_2 + 2 \sin \phi_1 \sin \phi_2 \cos(\phi_1 - \phi_2)}}{\sin(\phi_1 - \phi_2)}$$

(2b) $$R = L \frac{\sin \phi_1 + \sin \phi_2}{\sin(\phi_1 - \phi_2)}$$

(4) $$R' = \frac{2L^2 \sin^2 \phi}{C(T_2 - T_1)}$$

(5a) $$\sin \phi = \frac{2 \sin \phi_1 \sin \phi_2}{\sqrt{\sin^2 \phi_1 + \sin^2 \phi_2 + 2 \sin \phi_1 \sin \phi_2 \cos(\phi_1 - \phi_2)}}$$

(5b) $$\sin \phi = \frac{2 \sin \phi_1 \sin \phi_2}{\sin \phi_1 + \sin \phi_2}$$

PASSIVE TARGET DETECTION AND IDENTIFICATION SYSTEM

BACKGROUND OF THE INVENTION

1. Field of the Invention

The present invention relates to passive target location and more specifically to the location of targets by determining the time difference of arrival of electromagnetic emissions between a master station and two stations linearly positioned on either side thereof.

2. Description of the Prior Art

Early in the history of the radar art passive systems, e.g. systems that utilize target generated transmissions as signal sources, were employed to determine the location of radiating sources. Angles to the radiating sources at the two locations, a known distance apart, were determined with receiving antennas having cardioid patterns. The angle to the source being determined when the apex of the cusp of the cardioid was in the direction of the radiating source. The two measured angles and the known distance between the antenna locations were then triangulated to establish the position of the target. Since the angular range of the cardioid pattern cusp were relatively broad, inaccurate angular measurements resulted giving rise to relatively imprecise target location determinations.

Additionally, these systems were operative only in a single source environment. If two or more sources at different locations were emitting signals within the frequency reception band of the system, the system performance was seriously impaired.

Improved accuracy was realized with the advent of monopulse receiving systems. These systems provided significant improvements in the measurement of the angle to the radiated source, thus permitting a more accurate determination of the target location. In a multiple simultaneous signal environment operating within a monopulse beamwidth and within the bandwidth of the system, however, monopulse systems will provide an indication of a single target at a location determined by the angular centroid of the radiating sources. Thus these systems provide useful information of the location of emitters radiating time overlapping signals and operating within the receiver bandwidth only when one emitter is within the monopulse beamwidth. Though monopulse systems may provide target location information when the received signals are time separated, target location ambiguities exist when only two receivers are employed on a baseline.

In addition to the multiple target limitations, prior art systems do not have broadband capabilities and operate only within relatively narrow frequencies band.

SUMMARY OF THE INVENTION

In accordance with the principles of the present invention a radiating source location is determined from the reception of emissions from the source at three colinearly positioned receiving stations. The time difference of arrival between the reception of an emission at a centrally positioned receiver, the master station, and two outer receiving locations is determined and utilized with the known receiver separation distances to calculate the angles of arrivals at each of the outer receivers. These angles and the length of the base leg between the two outer receivers determine a triangle that unambiguously positions the target to an accuracy that is primarily a function of the base leg length between stations, improving as this length increases.

Target resolution in a high density target environment may be achieved by restricting the measurement of the time difference of arrival to narrow frequency and space angle bands. This may be achieved with a scannable antenna operable over a multiplicity of selectable radiation bands. Each selected radiation band is further divided into a multiplicity of narrow frequency bands, thus restricting observations to narrow frequency and space angle ranges prior to the determination of time differences of arrival between the master and slave stations. This frequency and angled selection establishes a high probability that the signals processed at the master and slave stations were emitted from a common source.

DESCRIPTION OF THE PREFERRED EMBODIMENTS

Figure 1A:
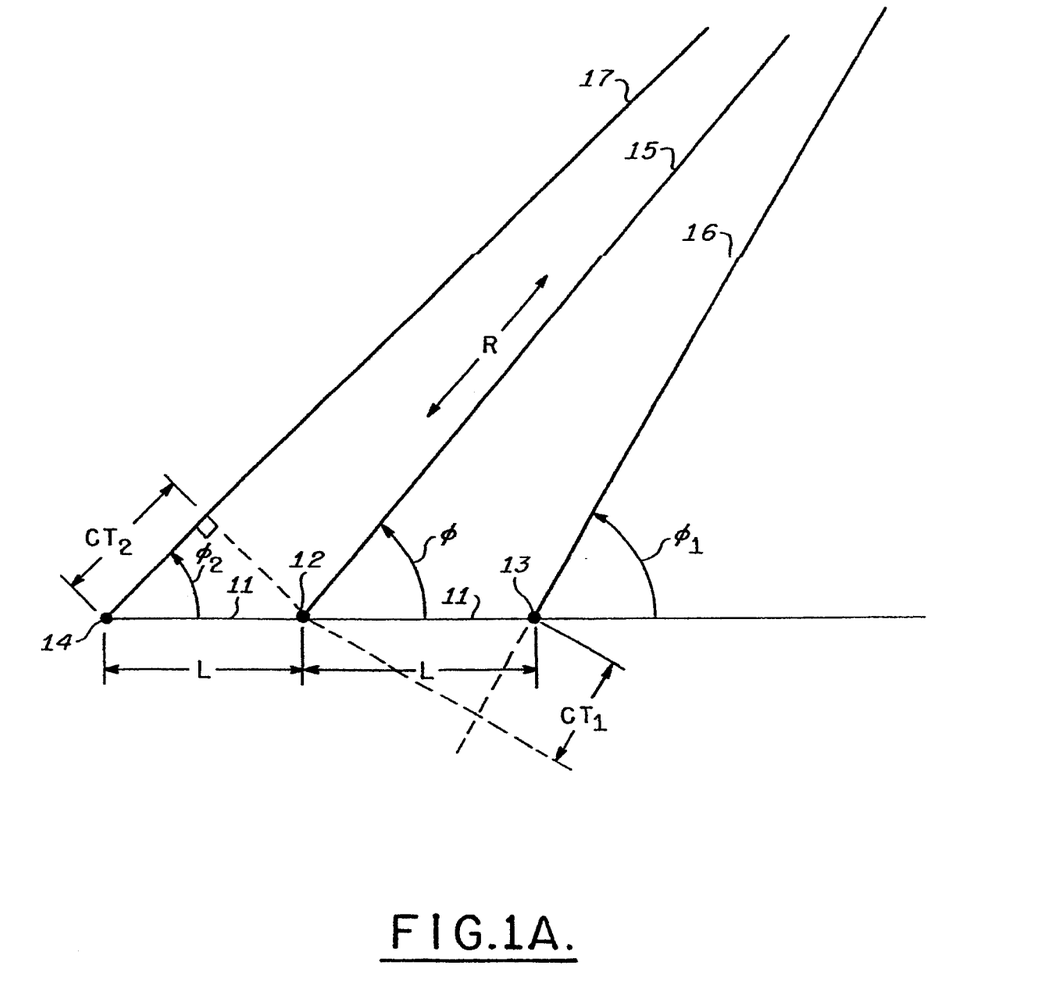
FIG. 1A is an illustration of the geometry for a three station passive detection system.

Refer to FIG. 1A wherein the geometrical representation of a preferred three station passive receiving system, in accordance with the present invention, is shown. Three receiving stations are positioned along a base line 11 with a master station 12 located an equal distance L from slave station 13 and 14. It will be recognized by those skilled in the art that equal distances between stations is not a requirement and that satisfactory operation may be realized with unequal master-slave station operation. Signals emitted from a target at a distance R from the master station 12 propagate along paths 15, 16, and 17 which respectively form angles $\theta$, $\theta_1$, $\theta_2$ with the baseline 11. These signals are correspondingly received at the master station 12 and the slave stations 13, and 14. The distance R from the master station to the target is very much greater than the overall length 2L of the baseline. To those well versed in the art it will be apparent that the paths 15, 16, and 17 are near parallel and that angles $\theta$, $\theta_1$, and $\theta_2$ are near equal. For purposes of clarity the deviation from parallelism and the angle differences have been exaggerated in the Figure.

Figure 1B:
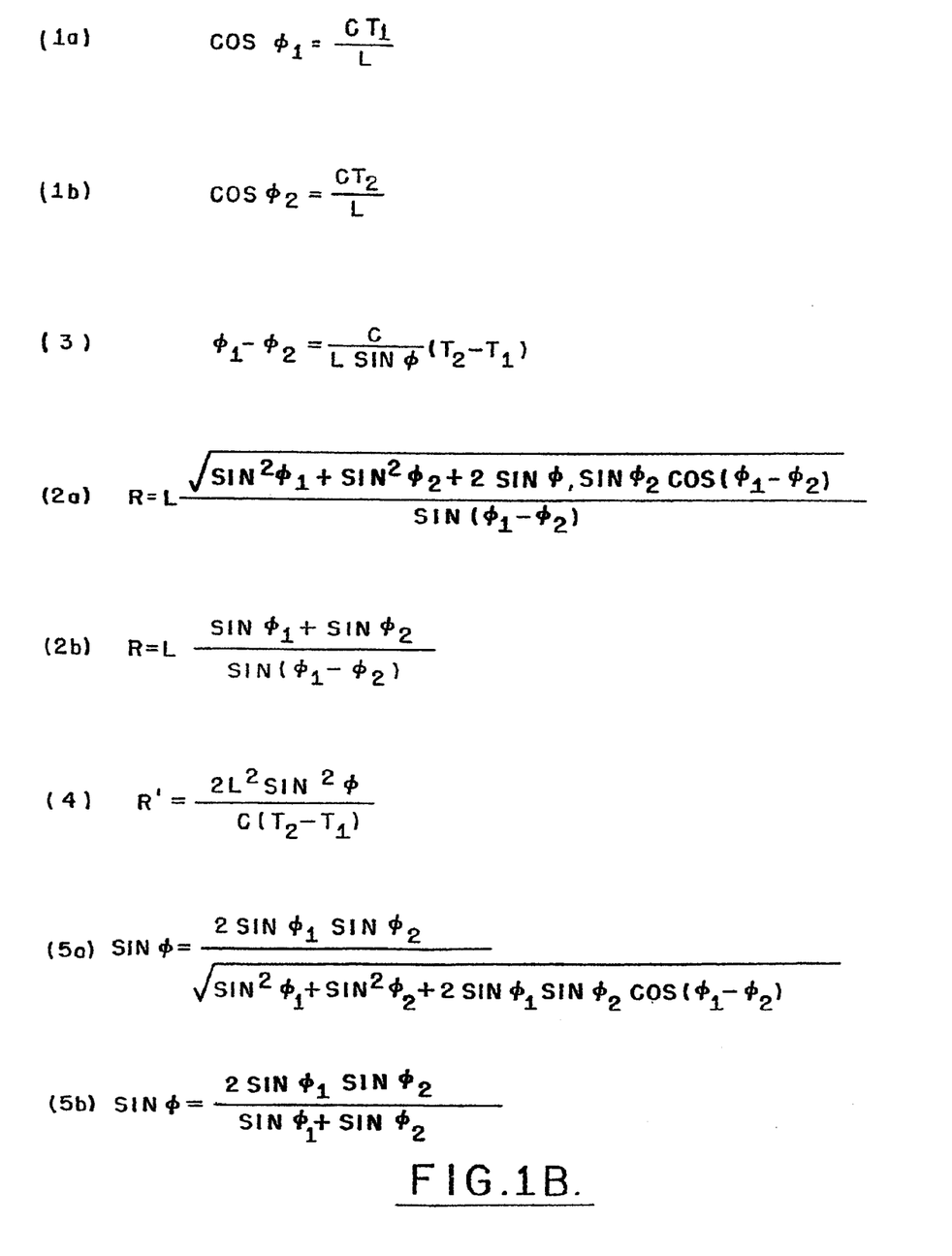
FIG. 1B is a list of equations used to explain the operation of the invention.

The direction to the target from the slave stations 13 and 14 may be established from the time difference of arrival (TDOA) of the signals at the slave and master stations. TDOA designated $T_1$ for slave station 13 and $T_2$ for slave station 14 are deemed positive when the arrival of the signals at the slave stations 13 and 14 respectively lead and lag the arrival of the signal at the master station 12. The time differences $T_1$ and $T_2$ determine the angles to the target from the slave stations 13 and 14 respectively in accordance with equations 1a and 1b of FIG. 1B. In these equations C is the free spaced velocity of propagation of the signal. Since TDOA is utilized, the determination of angle and range to the target is independent of frequency. This is apparent from the equations in FIG. 1B.

The range R to the target may then be determined from the length of the baseline and the angles $\theta_1$ and $\theta_2$ determined from the TDOA measurements $T_1$ and $T_2$. This range is given by equation 2a in FIG. 1B. Since $\theta_1$ is approximately equal to $\theta_2$ as previously discussed, equation 2a may be written to a very good approximation as equation 2b. Further, the difference between the angles $\theta_1$ and $\theta_2$ may be closely approximated by equation 3. Since the angle $\theta_1$ and $\theta_2$ differ by only small angular measurements equation 3 may be combined with equation 2b to provide an alternate expression for the range from the master station to the target that is given by equation 4. In these equations the angle $\theta$ is the angle to the target from the master station as shown in FIG. 1A. Target position in the plane determined by the target and the baseline 11 may be specified by the range of equations 2b or equation 4 and the angle $\theta$ as evaluated from the measured angles $\theta_1$ and $\theta_2$ by equation 5a. Since the difference between the angles $\theta_1$ and $\theta_2$ is small equation 5a may be approximated to a high level of accuracy by equation 5b.

Figure 2A:
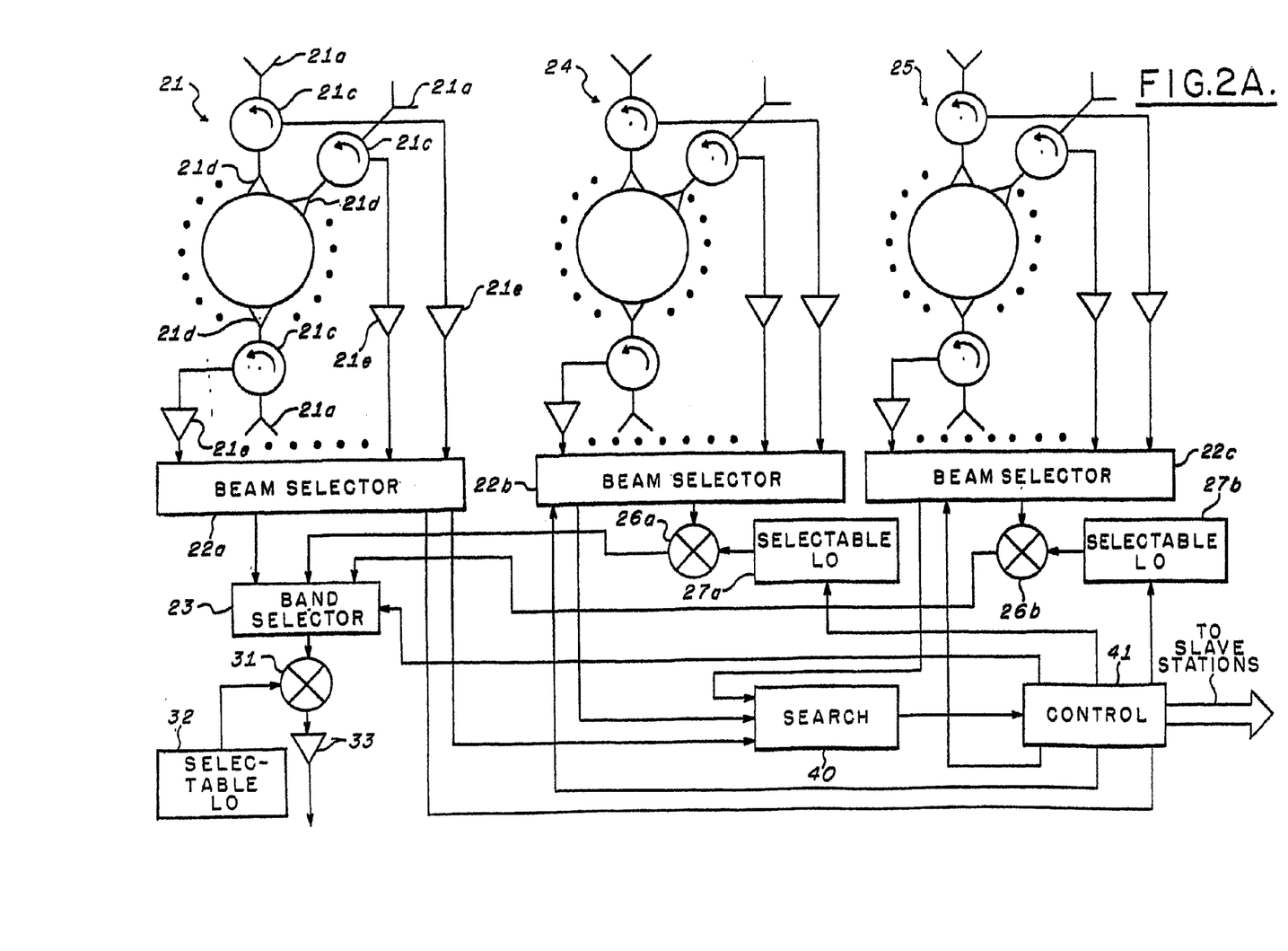
FIG. 2 is a block diagram of a preferred antenna system having angular sector and frequency selection capability.
Figure 2B:
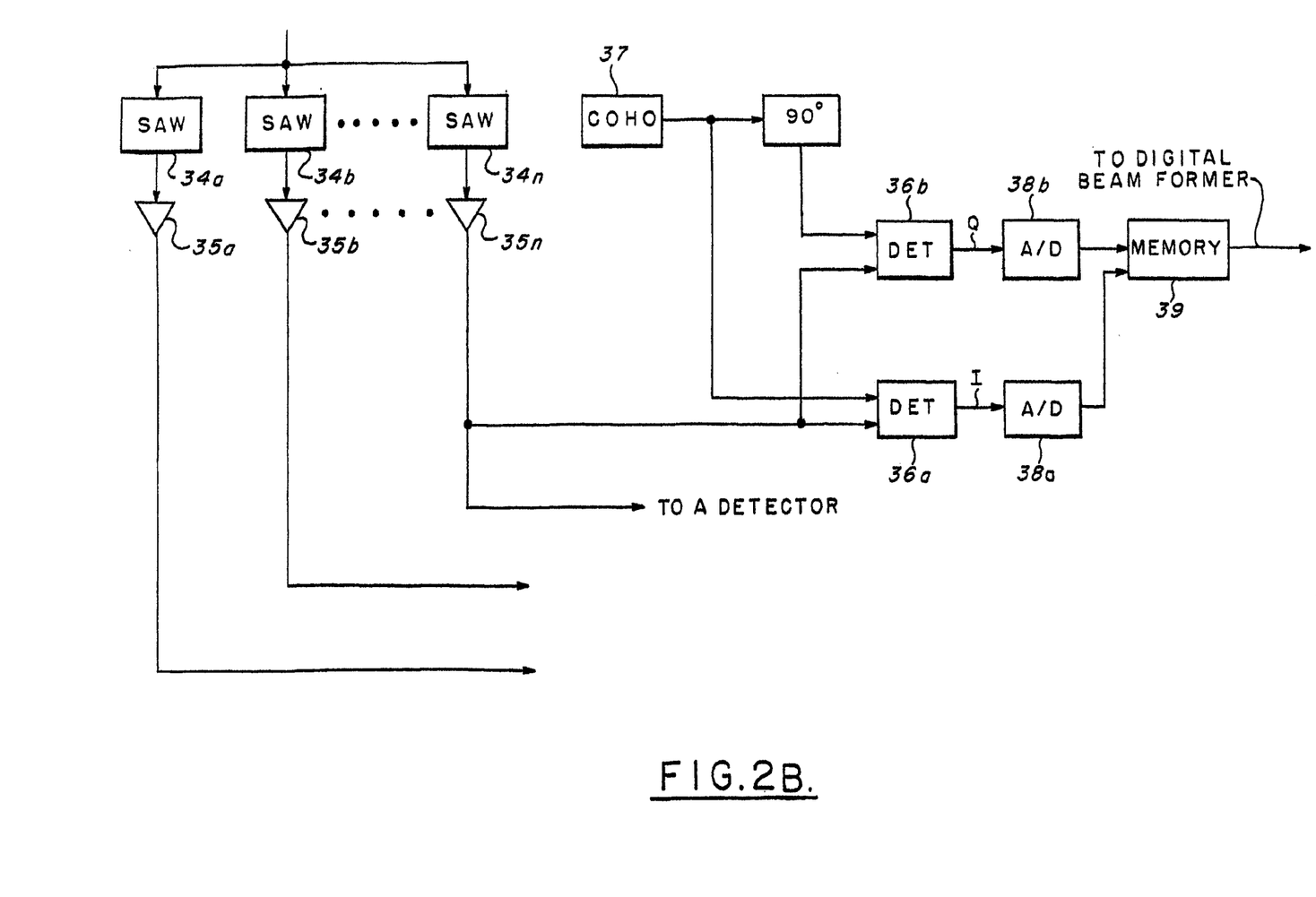
Figure 3A:
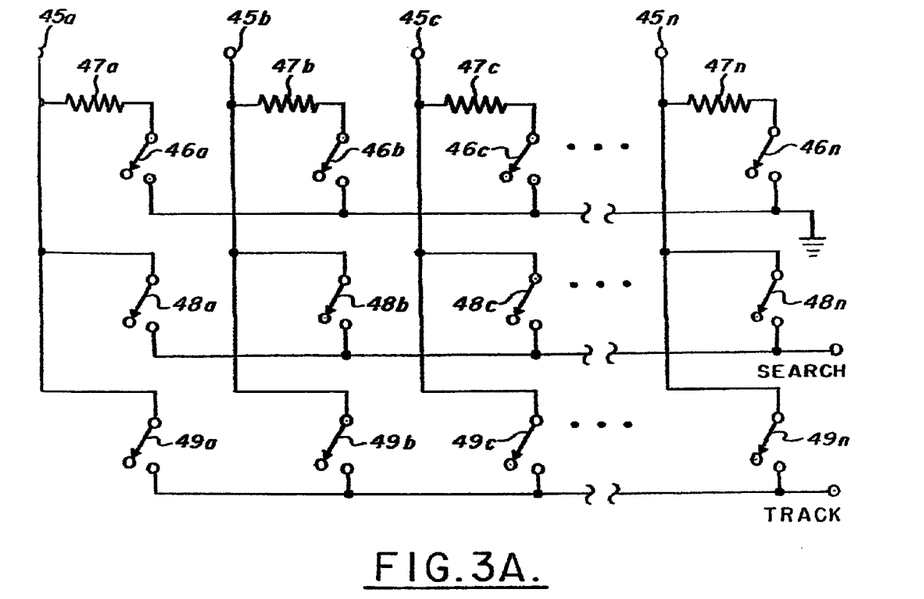
FIGS. 3A and 3B are schematic diagrams of switches useable with the antenna of FIG. 2.
Figure 3B:
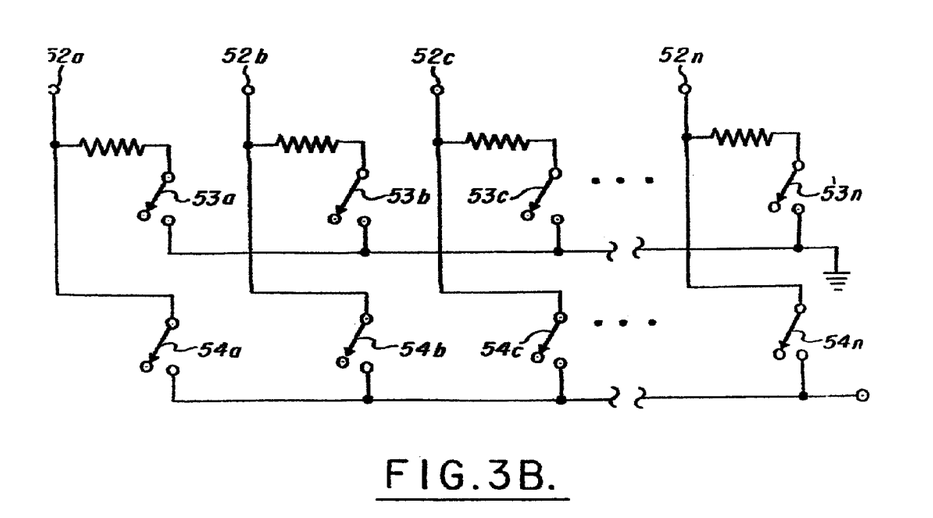

An antenna system that may be employed at each of the three stations along the baseline for passively searching specified angular sectors for targets radiating at an unknown frequency within one of three frequency bands, is shown in FIG. 2. A receiving antenna is provided for each frequency band as for example, antenna 21 for the lowest of the three frequency bands. Antenna 21 may comprise a plurality of receiving elements 21a circumferentially positioned about a Luneberg lens 21b. Each receiving element 21a is coupled to a port of a three port circulator 21c having a second port 21d coupled to the Luneberg lens 21b and a third port coupled via amplifiers 21e to a beam selector 22a. Electromagnetic energy received from a given direction is coupled from the receiving elements 21a, therefrom coupled via the circulator 21c to the Luneberg lens which, by a manner well known in the art, couples substantially all the received energy to one of the ports 21d corresponding to the angular sector of reception, and therefrom via circulator 21c and the amplifier 21e to the beam selector 22a. The beam selector, which may comprise a plurality of switches as shown in FIGS. 3A and 3B to be discussed subsequently, selectively couples each beam port of the Luneberg lens 21b to a frequency band selector 23.

Receiving antennas 24, 25 for the other frequency bands of interest are similarly constructed and operative, with the beam ports respectively coupled to beam selectors 22b and 22c. The output ports of the beam selectors 22b, 22c are respectively coupled to mixers 26a, 26b, whereto local oscillators 27a, 27b, having selectable frequencies, are correspondingly coupled. Frequency selection of the local oscillators 27a, 27b cause mixers 26a, 26b to couple signals that have frequencies within the first frequency band to the band selector 23.

Band selector 23 switchably couples the output ports of beam selector 22a, mixer 26a and mixer 26b to a third mixer 31. A sub-band of frequencies within the first frequency band is selected by tuning a third selectable frequency local oscillator 32 coupled to the mixer 31. The output of the mixer 31 may be coupled via an amplifier 33 to a bank of filters 34a through 34n, which may be of the surface acoustic wave (SAW) type, for further frequency selection. Each of the SAW filters 34 output ports may be coupled via amplifiers 35a through 35n to detectors 36a, 36b wherein the signals may be converted to inphase I and quadrature Q components relative to the phase of a coherent oscillator 37, analog-to-digitally converted in convertors 38a and 38b respectively and digitally stored in memory 39. Each I, Q digital pair stored in memory 39 corresponds to a beam selected by the beam selector 22 and a frequency selected by the frequency selection process described above. The stored digital signals corresponding to a selected frequency within a selected beam are coupled to a digital beam former wherein signals at a selected frequency within a plurality of selected beams are weighted and appropriately combined for beam shaping to establish a signal detection within a narrow angular spatial sector. For each signal so detected the frequency, spatial sector, and time of arrival is noted and stored.

Antenna operation for the track (measurement) mode at each of the three stations 12, 13, and 14 of FIG. 1A are as described above. Initial location of the target, however, is performed at the master station 12. At this station the beam selector 22 additionally functions to switch the beam ports of the Luneberg lens 21 to search mode circuitry 40. This circuitry may be substantially equivalent to the track mode circuitry through the filter banks 34, 35 and may operate in a similar manner. When target emissions are detected at the master station, the spatial sector and frequency thereof are coupled to the system control 41 to establish greater dwell time in the frequency band and spatial sector of the detection. Additionally, control 41 relays beam and band selector signals to the slave station to establish synchronism for all three stations. When all three stations are switched to the spatial sector and frequency band of the initial detection, the times of arrival of subsequent transmissions from the target that emitted the initially detected signal are thereafter noted at all three stations and processed accordingly.

A schematic diagram of a switch that may be utilized with the antenna at the master station is shown in FIG. 3A. Terminals 45a through 45n are correspondingly coupled to the circulators at each beam port of the Luneberg lens. For the switch configuration shown in FIG. 3A, each beam port couples to three switches, though for other applications additional switches may be stacked. The first 46a through 46n couples a matched termination 47a through 47n across the beam port when the system has been commanded to listen to another spatial sector. The second switch 48a through 48n couples the selected beam port to the search circuitry 40, while the third switch 49a and 49n couples the selected beam port to the track circuitry. Only one beam port may be activated at a time. Thus, all terminating switches 46 save the one coupled to the selected beam port are closed and all search 48 and track 49 switches are open save that coupled to the selected beam port. While only one beam port may be activated at a time the search and track switches at that port may be simulatenously closed, permitting search while track operation.

Since the slave stations do not perform the search function a simplified version of the switch as shown in FIG. 3B may be employed. In this configuration the terminals 52a through 52n are correspondingly coupled to the beam port circulators of the Luneberg lens and respectively to termination switches 53a through 53n and receiver coupling switches 54a through 54n. She switch network of FIG. 3B operates in the same manner as that of the network in FIG. 3A, only one of the receiver switches 54 being actuated for coupling a selected beam port to the receiver while only the terminating switch 53 of the selected beam port is open, all other beam ports being terminated through switches 53.

Figure 4:
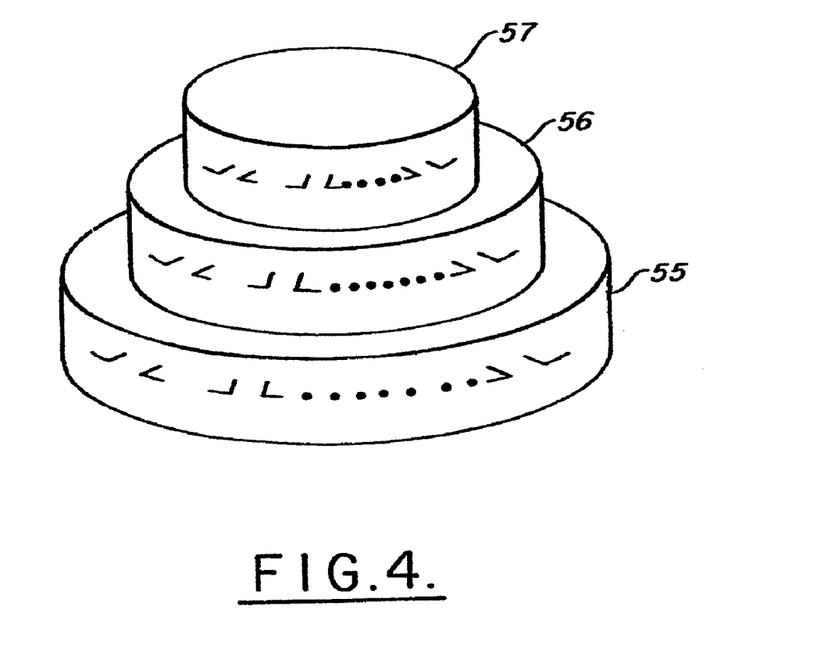
FIG. 4 is an illustration of an external configuration of the antenna of FIG. 2.

It is desirable that the antennas covering each frequency band be at a common location at each station. This may be accomplished by stacking the Luneberg lenses as shown in FIG. 4. Since it is desired that the beam width at each beam port be substantially equal, the diameter of the Luneberg lens 55 for the lowest frequency band must be greater than the diameter of the Luneberg lens 56 of the intermediate frequency band which in turn must have a larger diameter than that of the Luneberg lens 57 for the highest frequency band.

Figure 5A:
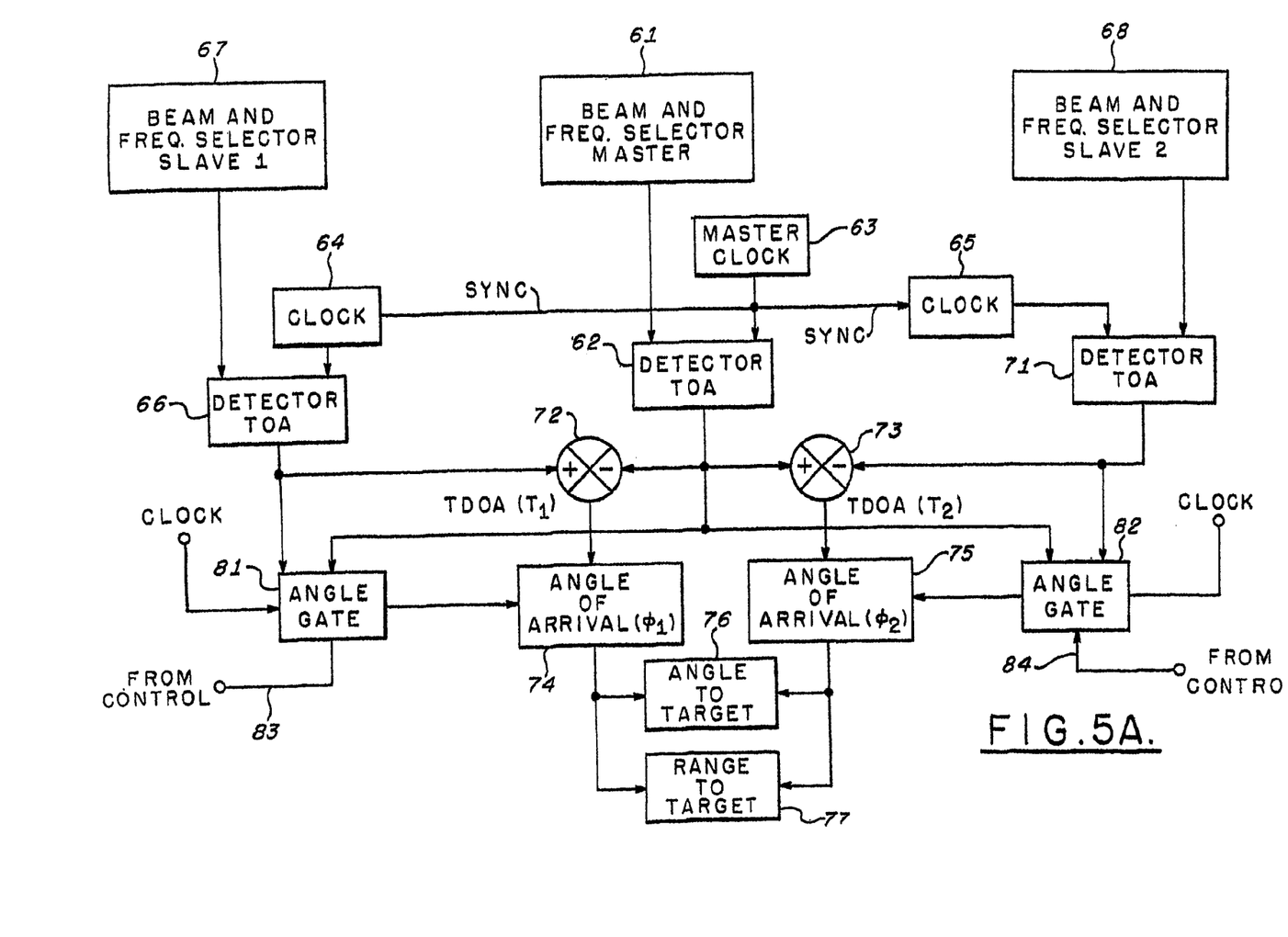
FIG. 5A is a block diagram of a preferred embodiment of the invention.

Referring now to FIG. 5A, the output signal from the beam and frequency selector at the master station 61 is coupled to a detector 62 which is timed by a master clock 63 wherein the receive signal is detected and its time of arrival noted. Sync pulses from the master clock 63 are transmitted to clock 64 at slave station 1 and clock 65 at slave station 2. Clock 64 times a detector 66 wherein signals received from the beam and frequency selector 67 of slave station 1 are detected and the time of arrival noted. Similarly, at slave station 2 signals from the beam and frequency selector 68 are detected and the time of arrival noted in detector 71 which is timed by the clock 65. The time difference of arrival $T_1$ between the signals coupled to detector 62 and 66 is determined by a differencing circuit 72, while the time difference of arrival $T_2$ between the signals coupled to detector 62 and 71 is determined in differencing circuit 73. Signals representing the time differences of arrival are coupled to angle of arrival measurement units 74 and 75 wherein the angle to the target at slave station 1 and slave station 2 are respectively determined. Signals representative of the angles $\theta_1$ and $\theta_2$ are coupled to an angle-to-target determining unit 76 and a range-to-target determining unit 77 wherein the angle and range to the target from the master station are determined in accordance with the equations of FIG. 1B.

To increase the probability that the signals received at the three stations were emitted from a common target the angle of arrival determining units 74, 75 may be respectively gated by angle gates 81, 82. Angle gate 81 may be activated by the first arriving signal from detector 62 and 66, while angle gate 82 may be activated by the first arriving signal from detector 62 and 71. Gates remain open, after activation, for a period of time corresponding to selected angular interval. The gated time interval is a function of the selected spatial sector, since the time intervals for constant angular intervals vary from sector to sector. To maintain a constant angular interval signals from control 41 may be coupled via lines 83, 84 respectively to the angular gates 81, 82 to vary the time interval in accordance with the selected spatial sector.

Figure 5B:
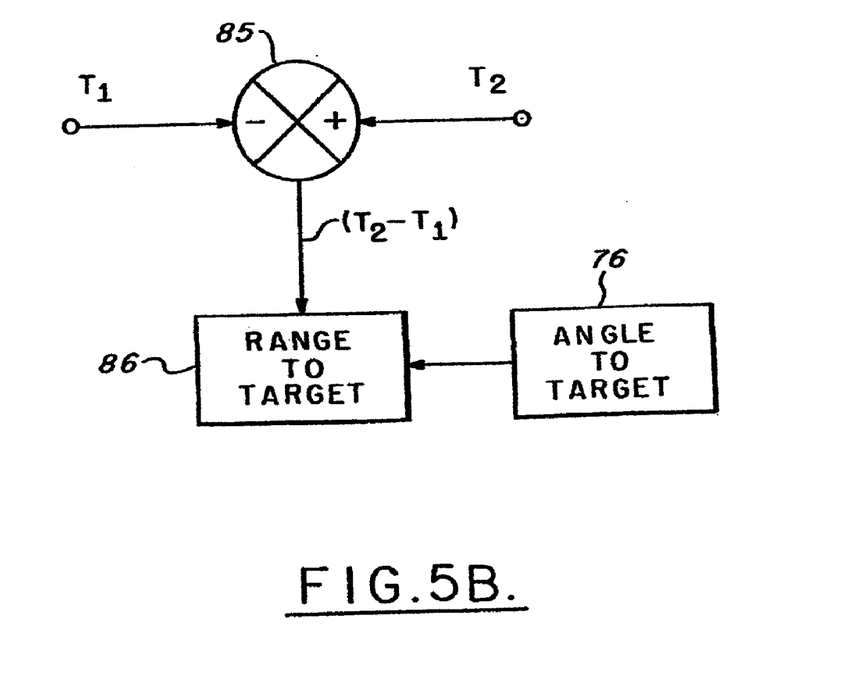
FIG. 5B illustrates a second method for determining range to target that may be utilized with the embodiment of FIG. 5A.

The configuration of FIG. 5A provides a determination of the range-to-the target with the utilization of a calculated angles $\theta_1$ and $\theta_2$ in equations 2a and 2b. Range to the target may also be calculated from the angle to the target at the master station and the difference between $T_2$ and $T_1$ in accordance with equation 4. Referring to FIG. 5B, signals representative of $T_2$, $T_1$ may be coupled to a differencing network 85 wherefrom a signal representative of the difference between $T_2$ and $T_1$ is coupled to a range-to-target determining unit 86. Also coupled to the range-to-target determining unit is a signal from the angle-to-target determining unit 86. The range-to-target is then s determined in accordance with equation 4 of FIG. 1B.

While the invention has been described in its preferred embodiments, it is to be understood that the words which have been used are words of description rather than limitation and that changes may be made within the purview of the appended claims without departing from the true scope and spirit of the invention in its broader aspects.

I claim:

1. A passive target location system operative on signals received from target mounted radiation sources comprising:

first means for receiving emissions from sources located on at least one target;

second and third means positioned on a line through said first receiving means at preselected distances on either side thereof for receiving emissions from said sources located on said at least one target;

means for determining time of arrival of an emission received from at least one of said sources at said second and third receiving means relative to time of arrival of said emission received at said first receiving means;

means for unambiguously determining angles of arrival of said emission at said second and third receiving means from times of arrivals at said second and third receiving means relative to said first receiving means, said angles of arrival being unambiguously determined with accuracies that are dependent on said preselected distances, said accuracies improving with increases in said distances and being independent of wavelengths of said emissions; and means for unambiguously determining range and angle-to-target from said angles of arrival and said preselected separation distances.

2. A passive target location system in accordance with claim 1 wherein said first, second, and third receiving means are operable over a plurality of predetermined signal frequency bands.

3. A passive target location system in accordance with claim 2 wherein said first, second, and third receiving means include a plurality of selectable antennas correspondingly operable over said frequency bands each capable of forming antenna beams over a multiplicity of selectable beam positions.

4. A passive target location system in accordance with claim 3 wherein said first, second, and third receiving means further include means coupled to said antennas for selecting sub-bands of frequencies within a selected one of said frequency bands.

5. A passive target location system in accordance with claim 4 further including means coupled to said sub-band selecting means for digitally forming antenna beams by processing signals received from a plurality of beams formed by one of said selectable antennas.

6. A passive target location system operative on signals received from target mounted radiation sources comprising:

first means for receiving emissions from sources located on at least one target;

second and third means positioned on a line through said first receiving means on either side thereof at preselected distances therefrom for receiving emissions from said sources located on said at least one target;

means for determining time of arrival of an emission from at least one of said sources at said second and third receiving means relative to time of arrival of said emission at said first receiving means;

means for determining, from said time of arrival at said second and third receiving means relative to said first receiving means, unambiguous angles of arrival of said emissions at said second and third receiving means, said angles of arrival being unambiguously determined with accuracies that are dependent on said preselected distances, said accuracies improving with increases in said distances and being independent of wavelengths of said emissions;

means for determining a difference between said relative time of arrival at said second and third receiving means;

means for determining angle-to-target from said angles of arrival and said preselected separation distances; and means for determining range-to-target from said difference of said relative times of arrival and said angle-to-target.

7. A passive target location system in accordance with claim 6 wherein said first, second and third receiving means are operable over a plurality of predetermined signal frequency bands.

8. A passive target location system in accordance with claim 7 further including means coupled to said selectable antenna for selecting sub-bands of frequencies within a selected one of said plurality of frequency bands.

9. A passive target location system in accordance with claim 7 wherein said first, second, and third receiving means include a plurality of selectable antennas correspondingly operable over said frequency bands each capable of forming antenna beams over a multiplicity of selectable beam positions.

10. A passive target location system in accordance with claim 9 wherein said first, second, and third receiving means further include means coupled to said selectable antennas for selecting sub-bands of frequencies within a selected one of said plurality of frequency bands.

11. A passive target location system in accordance with claim 10 further including means coupled to said sub-frequency band selecting means for processing signals received through a multiplicity of said antenna beams from one of said plurality of selectable antennas at a selected frequency to form beams with spatial coverage that is less than that provided by each of said multiplicity of antenna beams.

* * * * *